US006621252B2

(12) United States Patent
Zhang

(10) Patent No.: US 6,621,252 B2
(45) Date of Patent: Sep. 16, 2003

(54) CONTROL OF SINGLE-PHASE POWER CONVERTER IN D-Q ROTATING COORDINATES

(75) Inventor: Richard S. Zhang, Clifton Park, NY (US)

(73) Assignee: General Electric Company, Niskayuna, NY (US)

(*) Notice: Subject to any disclaimer, the term of this patent is extended or adjusted under 35 U.S.C. 154(b) by 83 days.

(21) Appl. No.: 10/001,299

(22) Filed: Oct. 19, 2001

(65) Prior Publication Data

US 2003/0076076 A1 Apr. 24, 2003

(51) Int. Cl.[7] ............................. G05F 1/70; H02M 7/797
(52) U.S. Cl. ......................... 323/205; 323/207; 363/41; 363/132
(58) Field of Search .................................. 323/205, 207, 323/208, 218, 219; 363/41, 132

(56) References Cited

U.S. PATENT DOCUMENTS

| | | | | |
|---|---|---|---|---|
| 5,187,427 A | * | 2/1993 | Erdman | 323/207 |
| 5,198,746 A | * | 3/1993 | Gyugyi et al. | 323/207 |
| 5,343,139 A | * | 8/1994 | Gyugyi et al. | 323/207 |
| 5,631,545 A | * | 5/1997 | Norman et al. | 323/205 |

OTHER PUBLICATIONS

"Indirect Current Control Scheme for a Single–Phase Voltage–Source Utility Interface Inverter,", Naser Abdel–Rahim, John E. Quaicoe, Canadian Conference on Electrical and Computer Engineering, 1993, pp. 305–308. (No month).
"A High Performance Sine Wave Inverter Controller with Capacitor Current Feedback and "Back–EMF" Decoupling," Michael J. Ryan, Robert D. Lorenz, Proceedings of IEEE Power Electronic Specialists Conference, 1995, pp. 507–513. (No month).
"Analysis and Design of a Multiple Feedback Loop Control Strategy for Single–Phase Voltage Source UPS Inverters," Naser Abdel–Rahim, John E. Quaicoe, IEEE Transactions on Power Electronics, vol. 11, No. 4, 1996, pp. 532–541. (No month).
"DSP–Based Multiple–Loop Control Strategy for Single–Phase Inverters Used in AC Power Sources," Shih–Liang Jung, Hsiang–Sung Huang, Meng–Yueh Chang, Ying–Yu Tzou, Proceedings of IEEE Power Electronics Specialists Conference, 1994, pp. 706–712. (No month).
"Control Topology Options for Single–Phase UPS Inverters," Michael J. Ryan, William E. Brumsickle, Robert D. Lorenz, IEEE Transactions on Industry Applications, vol. 33, No. 2, 1997, pp. 493–501. (No month).
"The Non–Ideal Generalized Amplitude Integrator (NGAI): Interpretation, Implementation and Applications," Xiaoming Yuan, Willi Merk, Proceedings of IEEE Power Electronics Specialists Conference, 2001, pp. 1857–1861. (No month).
"Stationary Frame Generalized Integrators for Current Control of Active power Filters with Zero Steady State Error for Current Harmonics of Concern Under Unbalanced and Distorted Operations Conditions," Xiaoming Yuan, Jost Allmeling, Willi Merk, Herbert Stemmler, Proceedings of IEEE Industry Applications Conference, 2000, pp. 2143–2150. (No month).

* cited by examiner

*Primary Examiner*—Jessica Han
(74) *Attorney, Agent, or Firm*—Ann M. Agosti; Patrick K. Patnode

(57) ABSTRACT

Imaginary orthogonal circuit state variables are established to enable transformation of real circuit state variables of a single-phase converter or the zero-sequence circuit of a three-phase converter from stationary coordinates to DQ rotating coordinates, thereby transforming the sinusoidal steady-state operating point of the real circuit into a DC operating point. A control provides the imaginary circuit state variables in a shifted queue comprising memory blocks for storing quarter-cycle shifted real circuit variables. Control of the converter is thus implemented in rotating DQ coordinates to achieve a theoretically infinite control loop gain at the fundamental frequency.

4 Claims, 6 Drawing Sheets

US 6,621,252 B2

CONTROL OF SINGLE-PHASE POWER CONVERTER IN D-Q ROTATING COORDINATES

BACKGROUND OF THE INVENTION

The present invention relates generally to power converters and, more particularly, to a method and apparatus for controlling a single-phase converter or the zero-sequence circuit of a three-phase converter.

A high control gain at the steady-state operating point (e.g., 60 Hz fundamental frequency) is desirable for power converters in order to minimize control error and to enhance dynamic performance. For a DC/DC converter, an infinite control gain at its steady-state operating point can theoretically be achieved using a proportional-integral (PI) compensator. In three-phase systems, a conventional control approach is to perform a DQ (Direct-Quadrature) transformation. The three-phase stationary coordinates are converted into DQ rotating coordinates so that the balanced three-phase sinusoidal waveforms in stationary coordinates become a DC value in rotating coordinates. Thus, not only is the DC operating point obtained for control design and stability analysis, but also a PI voltage or current compensator in rotating coordinates gives an infinite control gain at the fundamental frequency. Therefore, control accuracy at the fundamental frequency is easily achieved. Essentially, the DQ transformation converts the three-phase circuits with sinusoidal waveforms in stationary coordinates into several DC/DC converters with DC waveforms in rotating coordinates. Although DQ transformation and controller design in rotating coordinates are simple and powerful with respect to improving performance at the fundamental frequency, it is not directly applicable to single-phase power converters. That is, the DQ transformation needs balanced three-phase variables or two orthogonal rotating variables as inputs in order to achieve DC steady-state operation. Of course, for single-phase power converters, there is only one phase available.

For single-phase power converters, e.g., inverters and power factor correction rectifiers, the variables are sinusoidal in steady state. The design of controllers to achieve high control gains at their steady-state operating points is thus particularly difficult due to the time-varying voltages and/or currents.

In one approach, the design of a controller for single-phase power converters is performed in the same way as that of a DC/DC converter, i.e., ignoring the sinusoidal wave shape of either the reference voltage for inverters or the input voltage and reference current for PFC rectifiers. This control design approach, which follows the classic linear time-invariant system theory, is somewhat problematic since there is no true DC operating point due to the alternate current operation of the single-phase power converters. Typically, a so-called "quasi-steady-state" design approach is adopted wherein a few points along the sinusoidal operating waveform are selected as moving DC operating points. The controller and closed loop system stability are checked at the selected quasi-steady-state DC operating points. At least two problems arise with this approach: (1) The control design process does not reflect the true sinusoidal steady-state operating condition, and thus the control gain varies in a line cycle; and (2) The control gain at the fundamental frequency is limited to ensure stability, causing a significant control error in both the voltage/current amplitude and phase, unless the power converter operates at a very high switching frequency. In order to damp LC filter resonance in a single-phase inverter and thus improve control bandwidth, various multiple loop controllers have been proposed using the same linear time-invariant system control design approach, including capacitor current feedback, inductor current feedback, and load current feedforward, and variations thereof.

Another approach has been to use a nonlinear control structure, wherein the output of a linear voltage or current compensator that controls the RMS value of the voltage or current, is multiplied by a sinusoidal template to provide control to the power stage. This approach has two drawbacks. First, the control loop gain continuously varies along the sinusoidal waveform template, and it is lowest at the zero crossing, causing significant distortion. Second, the performance under nonlinear load is much worse as a result of multiplication in the controller, giving rich harmonic contents due to the frequency modulation effect.

Yet another approach is to use a high Q bandpass filter at the fundamental frequency in lieu of the traditional integrator in a PI compensator. However, this is difficult to implement with either analog or digital means and does not provide insight into stability margin.

Accordingly, it is desirable to provide an apparatus and control for single-phase power converters to achieve high control gain at the fundamental frequency. It is furthermore desirable to apply DQ transformation to single-phase power converters with implementation and stability analysis in rotating DQ coordinates, in order to achieve an infinite control loop gain at the fundamental frequency.

BRIEF SUMMARY OF THE INVENTION

Imaginary orthogonal circuit state variables are established to enable transformation of real circuit state variables of a single-phase converter or the zero-sequence circuit of a three-phase converter from stationary coordinates to DQ rotating coordinates, thereby transforming the sinusoidal steady-state operating point of the real circuit into a DC operating point. A control provides the imaginary circuit state variables in a shifted queue comprising memory blocks 34 for storing quarter-cycle shifted real circuit variables. Control of the converter is thus implemented in rotating DQ coordinates to achieve a theoretically infinite control loop gain at the fundamental frequency.

DETAILED DESCRIPTION OF THE INVENTION

Figure 1:
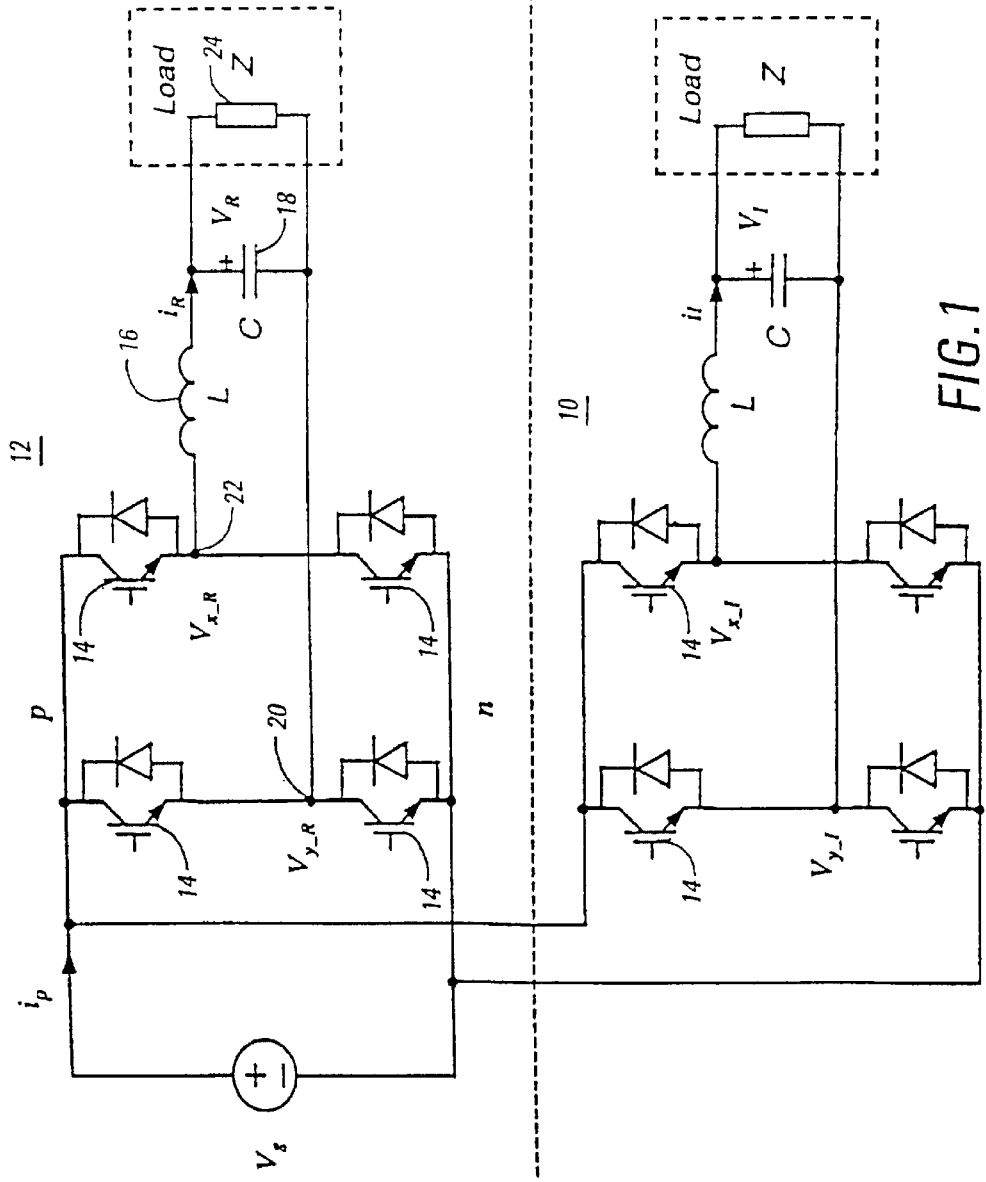
FIG. 1 schematically illustrates an exemplary embodiment of a real converter circuit and its corresponding imaginary orthogonal circuit in accordance with preferred embodiments of the present invention.
Figure 2:
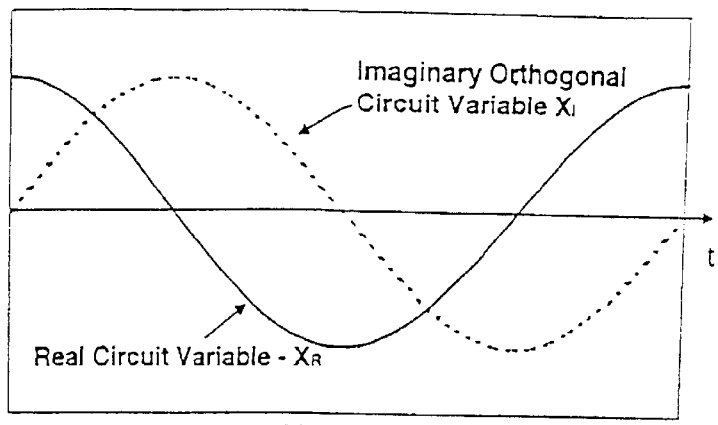
FIG. 2 graphically illustrates exemplary real and imaginary circuit variables.

In accordance with preferred embodiments of the present invention, an imaginary orthogonal circuit 10 is provided to allow transformation of an exemplary real circuit 12 from stationary coordinates to DQ rotating coordinates, thus transforming the sinusoidal steady-state operating point to a DC operating point. In particular, in order to construct orthogonal phase information with respect to the single-phase power converter, the imaginary orthogonal circuit 10 is provided to augment the original circuit, as shown in FIG. 1. By way of example, a single-phase converter comprising a single-phase inverter 12 is illustrated in FIG. 1 as comprising a full-bridge configuration of switching devices 14. An LC circuit comprising an inductor 16 and a capacitor 18 is coupled between the junctions 20 and 22 joining the switching devices of each leg of inverter 12. A load 24 is shown as being coupled across capacitor 18. Imaginary orthogonal circuit 10 comprises the same components as real circuit 12 (e.g., power switches, inductors, capacitors). However, the state variables (inductor current $I_I$ and capacitor voltage $V_I$) in steady-state lag by 90° their counterparts (inductor current $I_R$ and $V_R$, respectively) in the real circuit. That is, each imaginary circuit variable $X_I$ is orthogonal to the corresponding real circuit variable $X_R$, as illustrated graphically in FIG. 2.

Assuming the steady state real circuit variable $X_R$ is expressed as $$X_R = X_M \cos(\omega t + \phi) \quad (1),$$

where $X_M$ is the peak value of the sinusoidal waveform, $\phi$ is the initial phase and $\omega$ is the fundamental frequency, the corresponding imaginary circuit variable is $$X_I = X_M \sin(\omega t + \phi) \quad (2).$$

Applying a rotating transformation matrix T to the stationary real and imaginary circuit variables $$T = \begin{bmatrix} \cos(\omega t) & \sin(\omega t) \\ -\sin(\omega t) & \cos(\omega t) \end{bmatrix}, \quad (3)$$

the variables in DQ rotating coordinates become $$\begin{bmatrix} X_D \\ X_Q \end{bmatrix} = T \begin{bmatrix} X_R \\ X_I \end{bmatrix} = X_M \begin{bmatrix} \cos \varphi \\ \sin \varphi \end{bmatrix}, \quad (4)$$

where the variables in rotating coordinates $X_D$ and $X_Q$ may represent either the voltages or the currents in the rotating coordinates.

Figure 3:
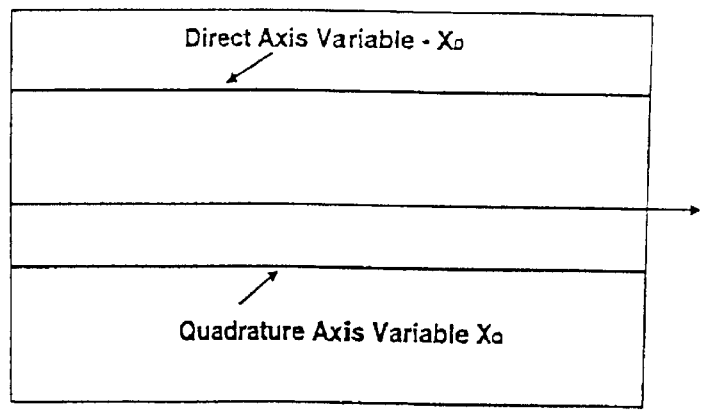
FIG. 3 graphically illustrates exemplary circuit variables in DQ rotating coordinates.

The variables in rotating coordinates become constants (DC values), as shown in equation (4) and FIG. 3. Thus, advantageously, the DQ rotating transformation can be applied to single-phase power converters as long as the imaginary circuit variables are available.

The inverse transformation matrix from the DQ rotating coordinates to the stationary real and imaginary circuit variables can be expressed as.

$$T_{inv} = T^T = \begin{bmatrix} \cos(\omega t) & -\sin(\omega t) \\ \sin(\omega t) & \cos(\omega t) \end{bmatrix}. \quad (5)$$

Even though the imaginary circuit does not physically exist, and the circuit variables such as inductor current and capacitor voltage cannot be sensed by feedback signals, the imaginary circuit variables can be constructed by using the real circuit variables since there is a fixed 90° or a quarter-cycle delay for the imaginary circuit variables with respect to the real circuit variables.

Figure 4:
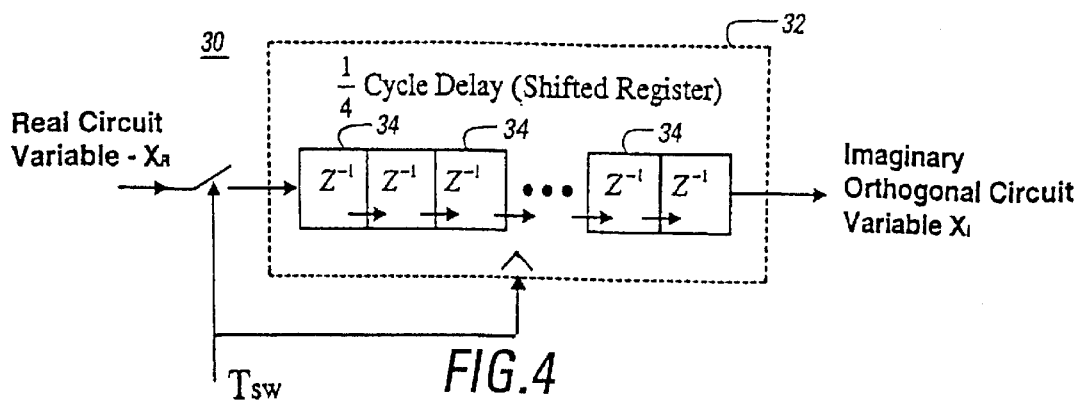
FIG. 4 illustrates in block diagram form construction of imaginary orthogonal circuit variables in accordance with preferred embodiments of the present invention.

Construction of the imaginary circuit variables can be implemented easily in a digital controller 30 by a shifted queue 32 comprising memory blocks 34 for storing quarter-cycle real circuit variables, as shown in FIG. 4. $T_{sw}$ is the switching period when the real circuit variables are sampled and stored in memory. For each switching period, the values in the queue are shifted one step so that only the most recent quarter-cycle real circuit variables are stored. Thus, the imaginary circuit variables are obtained at the output of the queue, i.e., the quarter-cycle delayed real circuit variables.

Figure 5:
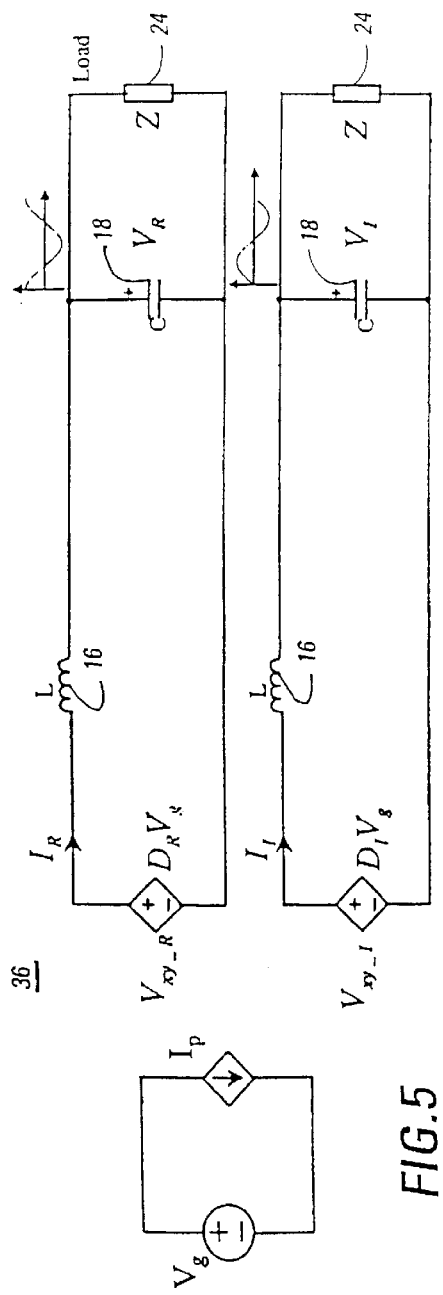
FIG. 5 schematically illustrates an average circuit model of the exemplary real circuit and imaginary orthogonal circuit of FIG. 1.
Figure 6:
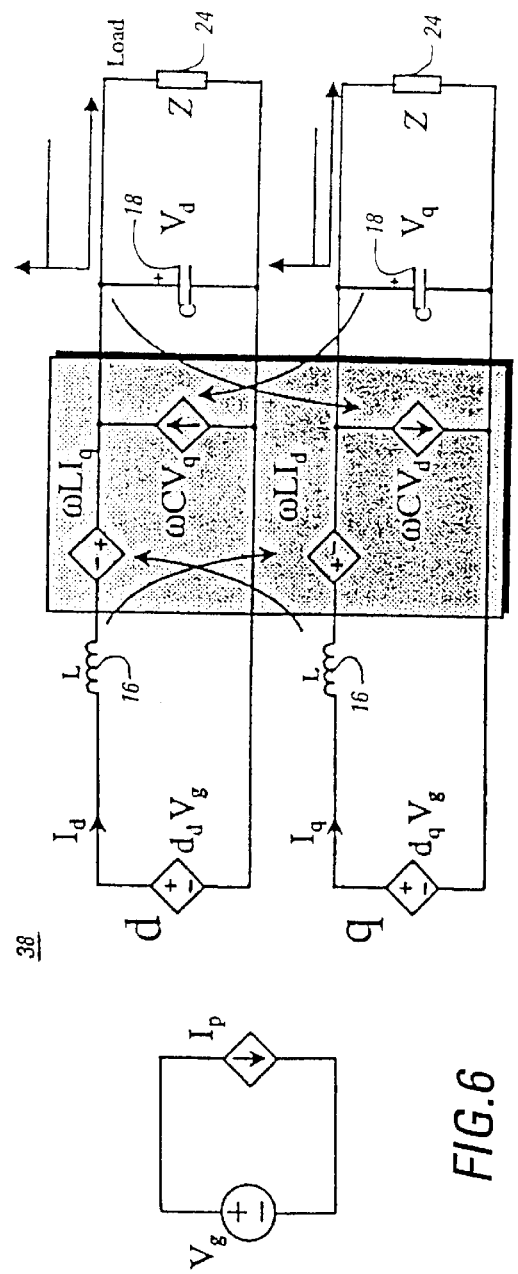
FIG. 6 schematically illustrates the circuit model of FIG. 5 in DQ rotating coordinate

For the purpose of controller design, the average model 36 of the real and the imaginary circuit is shown in FIG. 5. Applying the DQ rotating transformation expressed in equation (3) to the average circuit model in the real-imaginary (RI) stationary coordinates, the resultant circuit model 38 in DQ rotating coordinates is shown in FIG. 6. In RI stationary coordinates the steady-state output voltages $V_R$ and $V_I$ are sinusoidal, while in DQ rotating coordinates the steady state voltages $V_D$ and $V_Q$ are constant DC values.

Figure 7:
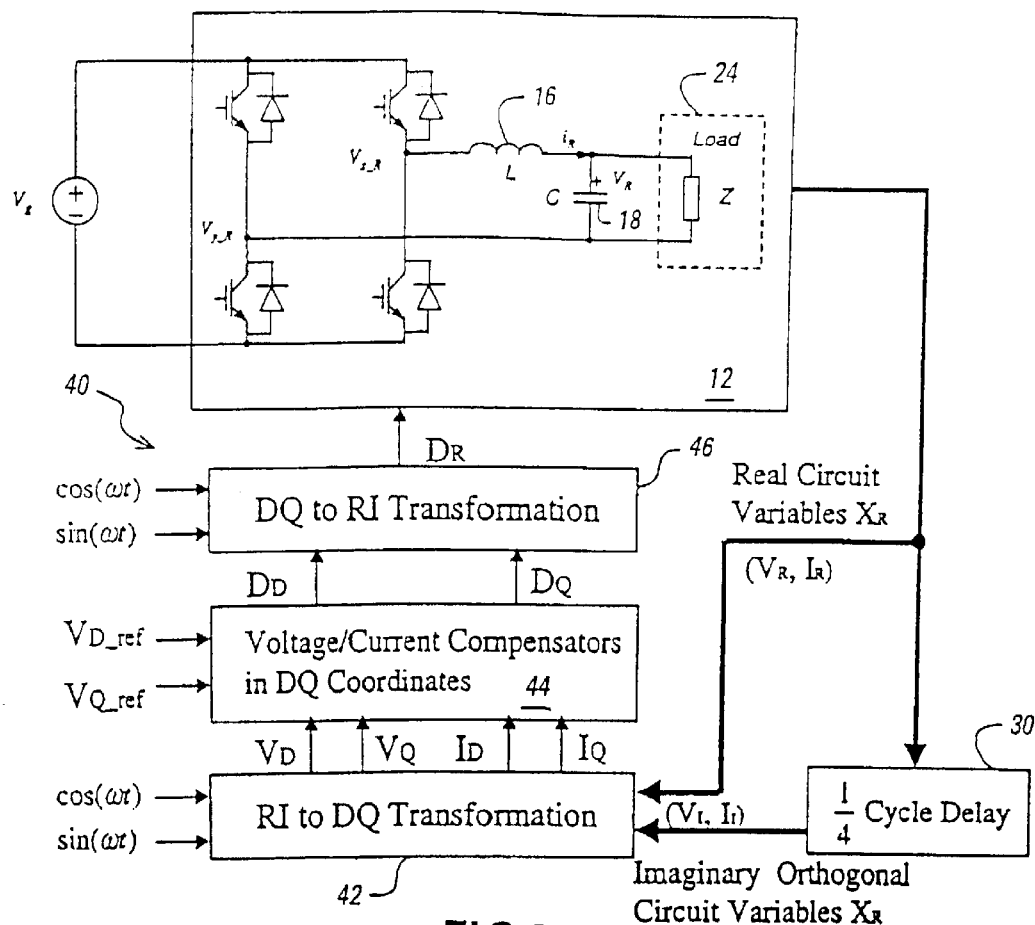
FIG. 7 illustrates in block diagram form a converter control in rotating DQ coordinates in accordance with preferred embodiments of the present invention.

Since an infinite control loop gain at steady state in rotating coordinates is equivalent to an infinite control gain at the fundamental frequency in stationary coordinates, the voltage and/or current controllers are designed in rotating coordinates. A controller structure 40 according to preferred embodiments of the present invention is illustrated in FIG. 7. The imaginary circuit variables are constructed using the real circuit variables via quarter-cycle delay block 32. The variables in RI stationary coordinates are then transformed into DQ rotating coordinates (block 42). Next, the normal voltage and/or current compensators are designed in rotating coordinates with constants as the voltage and/or current commands (block 44). Fourth, the control duty ratios (DD and DQ) are rotated from DQ coordinates back to RI stationary coordinates (block 46). Finally, the duty ratio control for the imaginary circuit is discarded, and only the duty ratio DR for the real circuit is applied.

Figure 8:
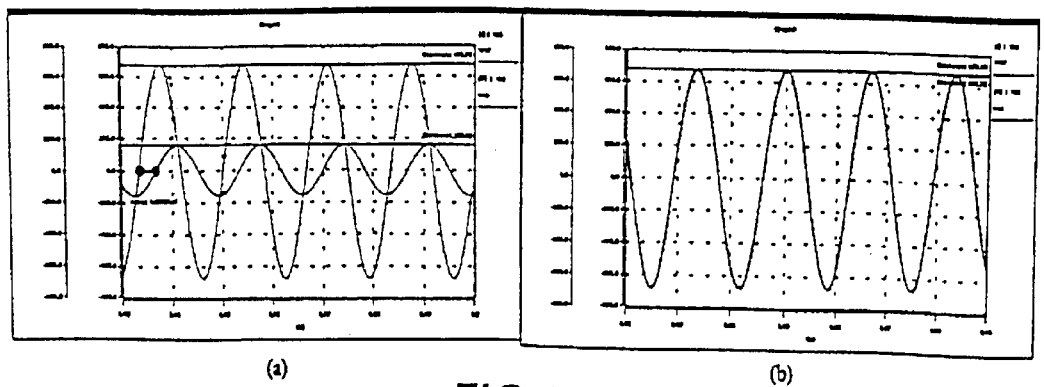
FIG. 8 graphically illustrates reference voltage and feedback voltage using the same voltage PI compensator in (a) stationary coordinates and (b) DQ rotating coordinates.

Simulation results in FIG. 8 demonstrate the advantage of the imaginary orthogonal circuit control according to preferred embodiments of the present invention for a single-phase inverter in the DQ rotating coordinates. With the same PI output voltage compensator, the traditional implementation in stationary coordinates resulted in significant magnitude and phase error between the command voltage and the feedback output voltage, while the implementation in DQ rotating coordinates avoided control errors, indicating a very high control loop gain at the fundamental frequency.

Although the description hereinabove is directed toward a particular example of a single-phase converter, those skilled in the art will understand that the principles of the present invention are applicable to other types of single-phase converters, such as, for example, a single-phase power factor correction rectifier for current control or the zero-sequence circuit of three-phase four-wire power converters.

Figure 9:
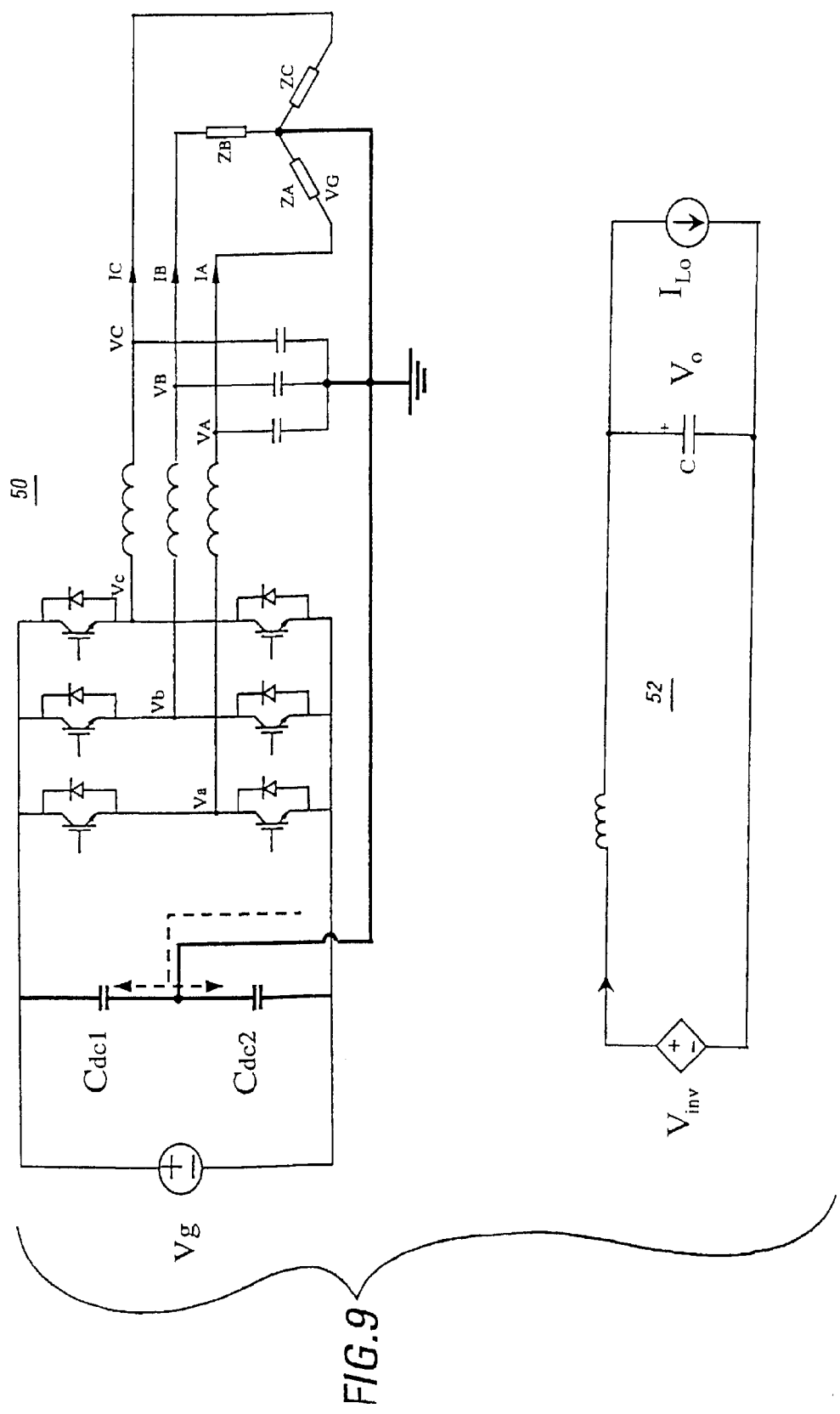
FIG. 9 schematically illustrates an exemplary embodiment of a three-phase, four-wire inverter and its equivalent zero-sequence circuit to which a control according to preferred embodiment of the present invention is applicable.

FIG. 9 schematically illustrates an exemplary embodiment of a three-phase, four-wire inverter 50 and its equivalent zero-sequence circuit 52 to which a control according to preferred embodiment of the present invention is applicable.

Figure 10:
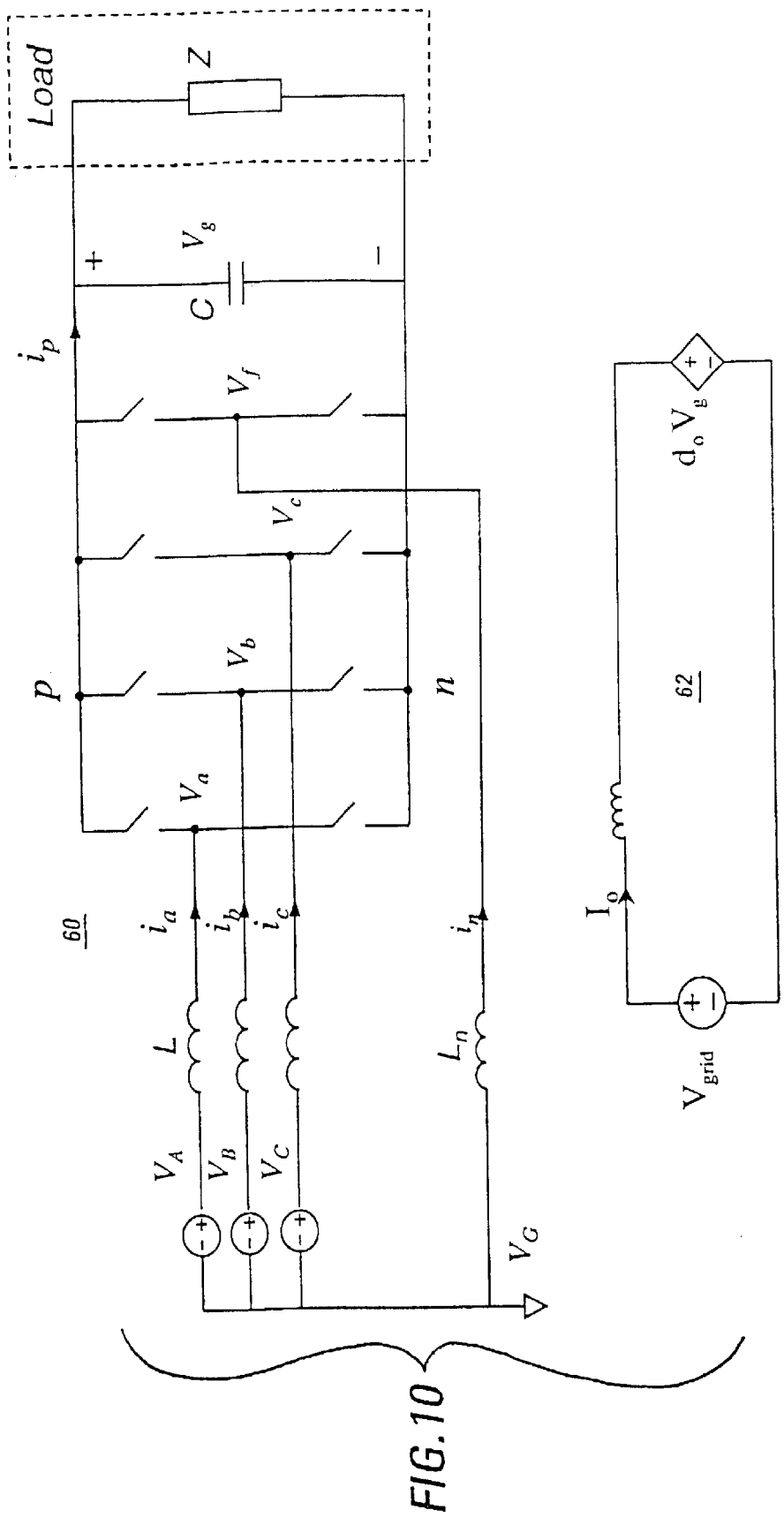
FIG. 10 schematically illustrates an exemplary embodiment of a three-phase, four-wire rectifier and its equivalent zero-sequence circuit to which a control according to preferred embodiment of the present invention is applicable.

FIG. 10 schematically illustrates an exemplary embodiment of a three-phase, four-wire rectifier 60 and its equivalent zero-sequence circuit 62 to which a control according to preferred embodiment of the present invention is applicable.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for controlling a single-phase converter or a zero-sequence circuit of a three-phase converter, comprising:
    determining imaginary state variables of an imaginary orthogonal circuit, such that the imaginary state variables are orthogonal to real state variables of the converter in stationary coordinates;
    transforming the real and imaginary state variables from stationary coordinates to DQ rotating coordinates;
    determining real and imaginary duty cycle signals in DQ rotating coordinates;
    transforming the real and imaginary duty cycle signals back to stationary coordinates; and
    applying the real duty cycle signal to control the converter.

2. The method of claim 1 wherein the step of determining imaginary state variables comprises shifting the real state variables by one-quarter cycle and storing the shifted variables in memory, the shifted real state variables being outputted as the imaginary state variables.

3. A control for a single-phase converter or a zero-sequence circuit of a three-phase converter, comprising:
    imaginary orthogonal circuit means for determining imaginary state variables of an imaginary orthogonal circuit, such that the imaginary state variables are orthogonal to real state variables of the converter in stationary coordinates;
    first transformation means for transforming the real and imaginary state variables from stationary coordinates to DQ rotating coordinates;
    compensation means for determining real and imaginary duty cycle signals in DQ rotating coordinates;
    second transformation means for rotating the real and imaginary duty cycle signals back to stationary coordinates; and
    control means for applying the real duty cycle signal to control the converter.

4. The control of claim 3 wherein the imaginary orthogonal circuit means comprises a shift register circuit for shifting the real circuit state variables by one-quarter cycle and storing the shifted variables in memory, the shifted real circuit variables comprising the output of the shift register circuit.

* * * * *